United States Patent [19]
Cheng et al.

[11] Patent Number: 5,644,174
[45] Date of Patent: Jul. 1, 1997

[54] UNIVERSAL AC SEQUENCER FOR A SERVER

[75] Inventors: Chin Y. Cheng; Stimson Ho, both of Cupertino, Calif.

[73] Assignee: Sun Microsystems, Inc., Mountain View, Calif.

[21] Appl. No.: 621,827

[22] Filed: Mar. 22, 1996

[51] Int. Cl.[6] ...................................................... H02J 3/14
[52] U.S. Cl. .......................... 307/41; 307/38; 364/273;
364/273.1; 364/273.2; 364/273.4; 364/273.5;
364/492; 364/707; 395/280; 395/290; 395/298
[58] Field of Search .................... 307/41, 38; 364/492,
364/707, 273–273.5; 395/280, 290, 298

[56] References Cited

U.S. PATENT DOCUMENTS

| | | | |
|---|---|---|---|
| 4,593,349 | 6/1986 | Chase et al. | 364/200 |
| 5,081,609 | 1/1992 | Getson et al. | 395/425 |
| 5,375,209 | 12/1994 | Maher et al. | 395/275 |
| 5,490,254 | 2/1996 | Ziegler et al. | 395/280 |
| 5,563,455 | 10/1996 | Cheng | 307/41 |

*Primary Examiner*—William M. Shoop, Jr.
*Assistant Examiner*—Albert W. Paladini
*Attorney, Agent, or Firm*—Flehr Hohbach Test Albritton & Herbert LLP

[57] ABSTRACT

An AC sequencer receives source AC voltage via a sequencer-mounted universally accepted connector, such as an IEC 309 compatible connector. Source AC is coupled by an AC connector plug and AC power cord from a wall socket to the AC sequencer via a mating connector. Although specifications for the AC power cord and AC connector will vary from country to country, the same AC sequencer may be used in many countries. Further, the AC sequencer receives control and status signals via sequencer-mounted universally accepted connectors, and can respond to signals that may be voltage-sourced, current-sourced, in addition to signals representing switch openings and closures. This permits a master server AC sequencer to be intelligently daisy-chained to remote slave units containing a similar AC sequencer, such that status information may be received from and control signals sent to the slave unit.

15 Claims, 6 Drawing Sheets

UNIVERSAL AC SEQUENCER FOR A SERVER

FIELD OF THE INVENTION

The invention relates to AC sequencers that are used to power-up computer network servers, and more specifically to providing such sequencers that meet domestic and foreign power cord and connector specifications, and that can provide a daisy-chain function with status information as to another sequencer slaved to a first sequencer.

BACKGROUND OF THE INVENTION

Networks are electronic systems that include server stations that couple information to one or more client/slave stations. When a server is first turned on, e.g., when electrical power is first applied, it is important to first power server units such as the central processing system ("CPU"), often referred to as a "card cage", and then provide power to ancillary systems, including memory units. It is the function of an AC sequencer to ensure that server power-up applies power to server units in a correct sequence. For example, if power were simultaneously and instantly applied to all units within the server, the in-rush of current would almost certainly trip circuit breakers associated with the source of AC power into the sequencer.

FIG. 1A shows a prior art network system 10 such as might be used in the United States. System 10 includes a server 20 and a client/slave 30, each of which is mounted in a cabinet or relay-type rack 40. Rack 40 commonly measures perhaps 142 cm in height, and about 56 cm in width and depth. Source AC power to units 20 and 30 is received via a power cord 50 whose free end is connected to an AC connector 60 sized to fit into an AC wall outlet receptacle 70. As well be described, the other end of power cord 50 is hardwired to an AC sequencer unit 80 within rack 40. Typically source AC power is about 210 VAC to 240 VAC, 50 Hz to 60 Hz, 30 A maximum.

Each unit 20, 30 includes an AC sequencer 80 that receives source AC via hardwired power cord 50, and sequentially provides AC operating power to other units within unit 20 or unit 30. Because unit 20 is a server unit 20, it will include a central processing unit card ("CPU") 90, which card is not present in slave unit 30. As shown in FIG. 1A, present in unit 20 and slave unit 30 are a fan tray 100 for cooling the unit, and storage or memory trays, shown as 110A, 110B, 110C, etc. The storage units may include perhaps six hard disk drive assemblies, compact disk ("CD") assemblies, optical disk assemblies, and magnetic tape drives. Client/slave unit 40 is shown with a further memory unit, memory tray 110C, that has been plugged into cabinet 30 in lieu of a CPU card tray 80. In this fashion, unit 30 is able to provide additional storage capability by allowing three rather than two trays for memory assemblies.

If AC operating power were simultaneously provided to unit 20 and unit 30 at power-up, the resultant current surge could exceed the current limit of protective circuit breakers within each AC sequencer unit. Further, simultaneous receipt of AC operating power by CPU tray 90 and various associated memory trays, e.g., 110A, 110B, could result in inoperative starting states for the master unit 20. Thus, a function of AC sequencer 80 is to receive raw AC power from wall socket 70, and to sequentially provide operating power to other units within the same rack 40.

More specifically, each AC sequencer 80 typically outputs AC operating voltage to three power output ports.

A first outlet port 120 provides the "unswitched" AC voltage as soon as operating voltage is coupled to the AC sequencer. A second outlet port 130 provides a "switched 1" AC voltage, which is defined as a voltage which is applied only after application of a POWER-ON switch closure control signal to port 135-IN. A third outlet port 140 provides a "switched 2" AC voltage which is defined as a voltage which is applied only after a delay time of about four to six seconds from occurrence of the "switched 1" AC power.

The connection between each AC sequencer 80 and control input port 135-IN is hardwired to the AC sequencer. Further, each AC sequencer outputs control signals through an output control port 135-OUT. These control signals may be coupled via a cable 155 to the input control port 135-IN of another unit 30, as shown in FIG. 1A.

System 10 in FIG. 1A is intended for use in the United States. As such, wall connector 70, AC connector plug 60 and power cord 50 (among other components) must satisfy Underwriter Laboratories ("UL") standards that apply to electrical equipment used in the United States. For example, the diameter and number of wires within the power cord 50 and the dimensions and configuration of the AC connector plug 60 will be governed by applicable UL standards.

However, electrical power standards differ from country to country. Thus, although network systems, servers and client/slaves are commonly used world-wide, manufacturers of AC sequencers have had to manufacture different sequencer versions for different countries. For example, FIG. 1B depicts a system 10' such as might be used in Europe or in another country whose electrical power standards do not conform to UL standards.

Among other changes, wall-mounted AC outlet receptacle 70' will have a different configuration than a U.L. approved receptacle 70. Because applicable standards differ, AC plug 60', and AC power cord 50' will be different, and AC connector 60', and indeed sequencer 80' must thus be changed for system 10' from what was manufactured for system 10.

Unfortunately, standards applicable in various foreign countries preclude providing AC sequencer 80' with multiple AC power cords 50' and AC connector 60'. Such standards also preclude providing differently shaped connectors on the AC sequencer, into one of which a suitable AC power cord could be plugged, rather than hard-wire the AC power cord to the AC sequencer. The other end of such an AC power cord could otherwise have attached an AC connector plug appropriate for the country in which the sequencer was to be used.

The inability of prior art AC sequencers 80, 80' to conform to applicable electrical power and connector standards in all major countries adds to the manufacturing cost that a "family" of sequencers must be produced. Stated differently, if a single AC sequencer could be designed for use world-wide, the cost to produce and indeed maintain the sequencer would be reduced.

Prior art AC sequencers such as shown in FIGS. 1A and 1B suffer an additional deficiency in that often there is a need for more resources than can be supported in a single cabinet rack 40. For example, server 20 may require more storage capacity than can be accommodated using only memory trays 110A, 110B, yet there are no additional tray spaces to receive additional memory. One solution might be to daisy-chain server 20 with a slave 30 using cable 155 and associated connectors. This might provide server 20 with more resources, for example, three additional trays of memory within cabinet 30. In such an application, unit 30 would not be a client per se, but rather a slave that provides additional resources to master unit 20.

Unfortunately, such daisy-chaining is not readily implemented using prior art AC sequencers because there is not a universally accepted connector for the control input/output signals 135-IN, 135-OUT. A second impediment to such daisy-chaining is that the control signals presented at 135-IN could only be switch openings or closures (e.g., a 0 Ω or ∞Ω condition). If the control could also accept voltage or current source signals, it would be possible to couple slave sequencers to master sequencers such that full control and status information with respect to the slave unit was available at the server unit.

Thus, there is a need for an AC sequencer to which AC operating power may be coupled in a universal fashion such that a common AC sequencer complies with applicable power standards in all major countries of the world. Further, such an AC sequencer should include a universally acceptable control input and output port that can respond not only to a switch closure, but to a voltage source signal as well as to a current source signal. Finally, such an AC sequencer should also provide indication of the status of units in a slave system coupled to a master system AC sequencer.

The present invention discloses such an AC sequencer.

SUMMARY OF THE PRESENT INVENTION

The present invention provides an AC sequencer with a universally accepted inlet connector, preferably a IEC 309 connector. An AC power cord and AC connector that comply with electrical standards in the country in which the sequencer is used provide AC power to the sequencer via a mating, internationally accepted, IEC 309-type connector. Although the AC power cord and AC connector requirements are governed by the electrical power standards of the country in which the server or client/slave containing the AC sequencer is used, the identical AC sequencer may be used in all countries.

Further, an AC sequencer according to the present invention provides universally accepted internal control signal input and output connectors, to couple control and status signals that may be from a voltage source, a current source, and/or switch openings/closures. This enables a server unit containing a master AC sequencer to receive status information as to peripheral equipment plugged into a slave unit that is daisy-chained to the master unit. Further, the slave unit may be powered-down from the master unit or from the slave unit.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1A:
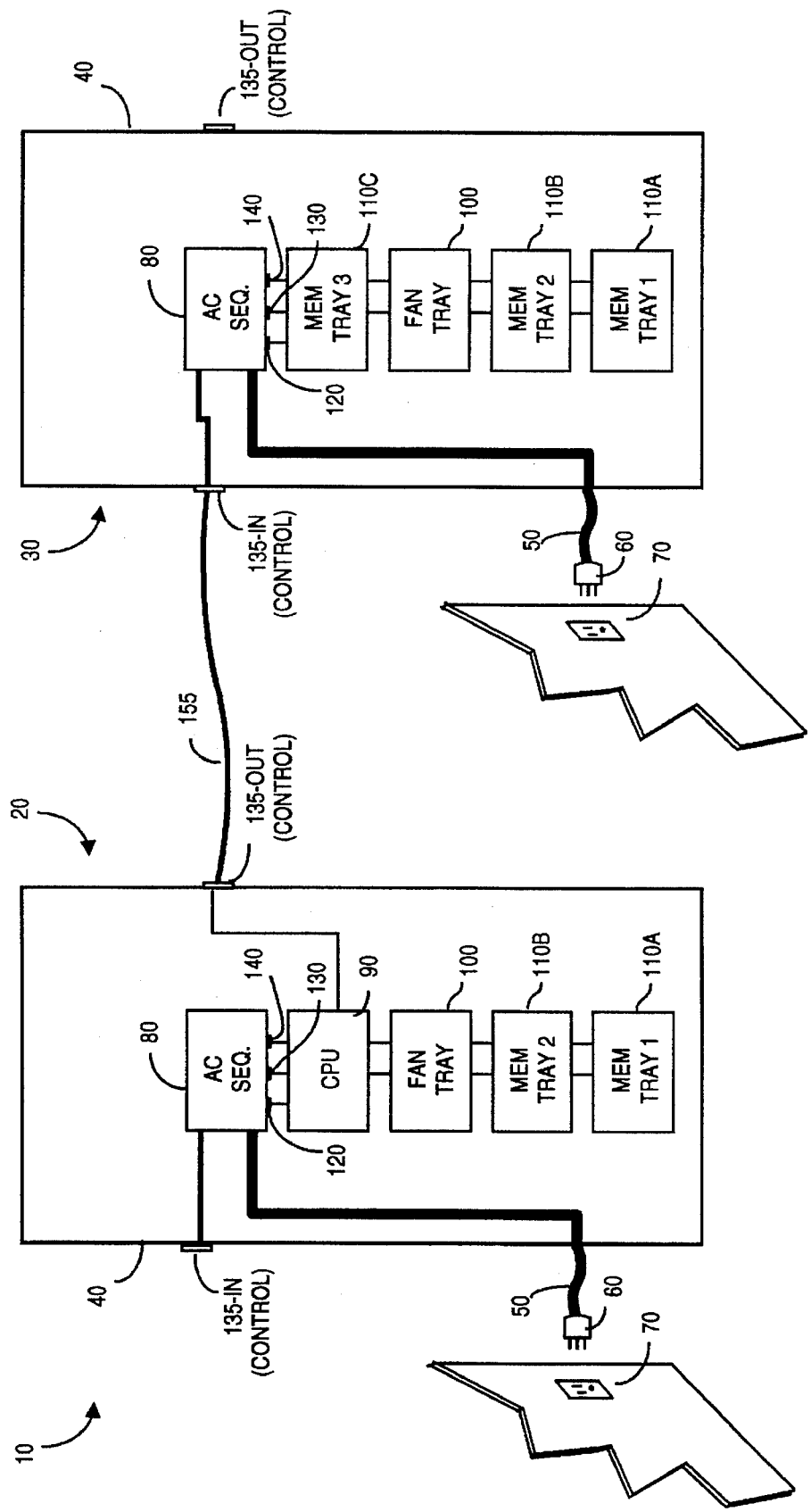
FIG. 1A depicts a system employing an AC sequencer manufactured according to applicable United States standards, according to the prior art.
Figure 1B:
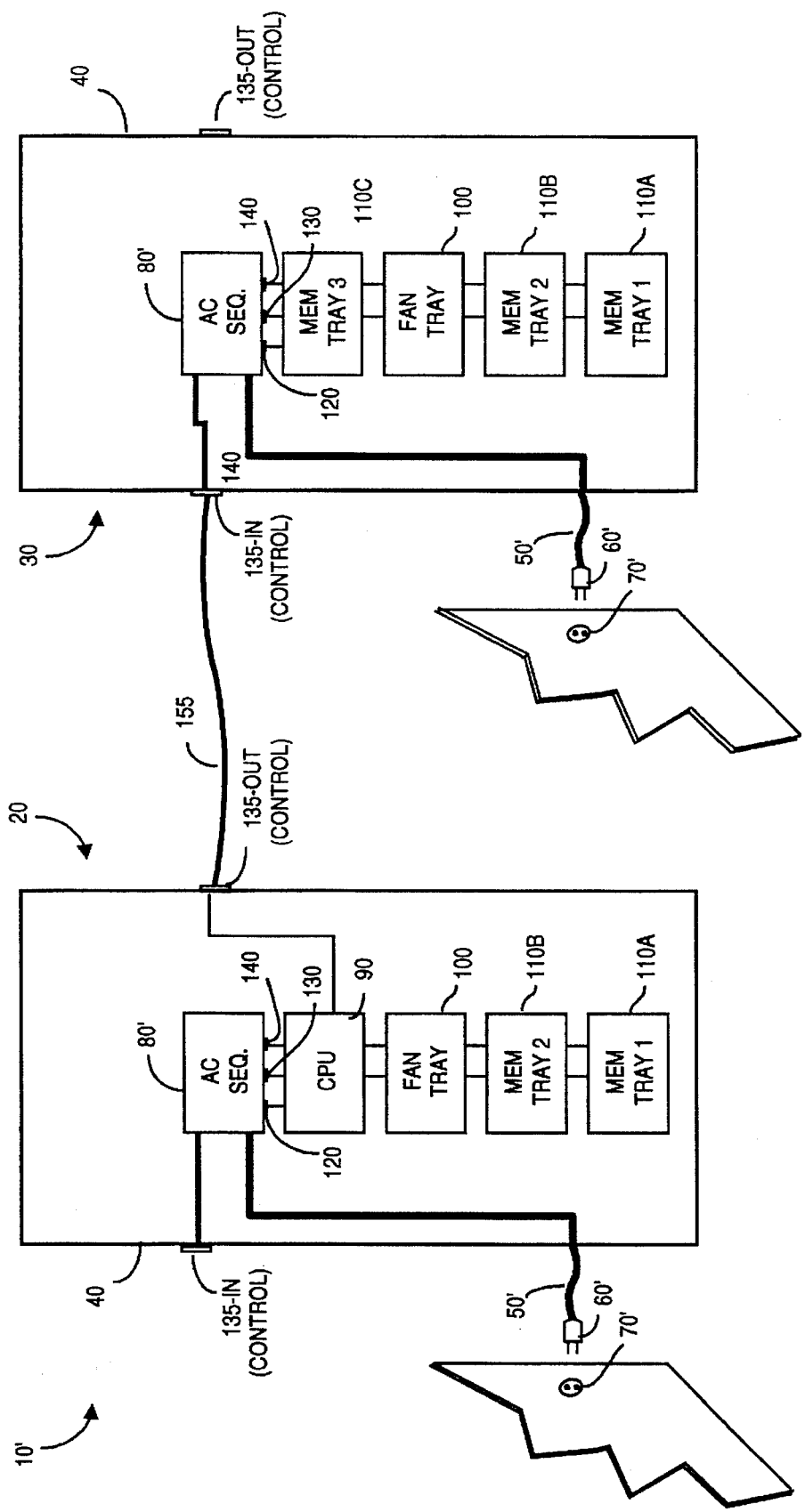
FIG. 1B depicts a system employing an AC sequencer manufactured according to applicable foreign standards, according to the prior art.
Figure 2A:
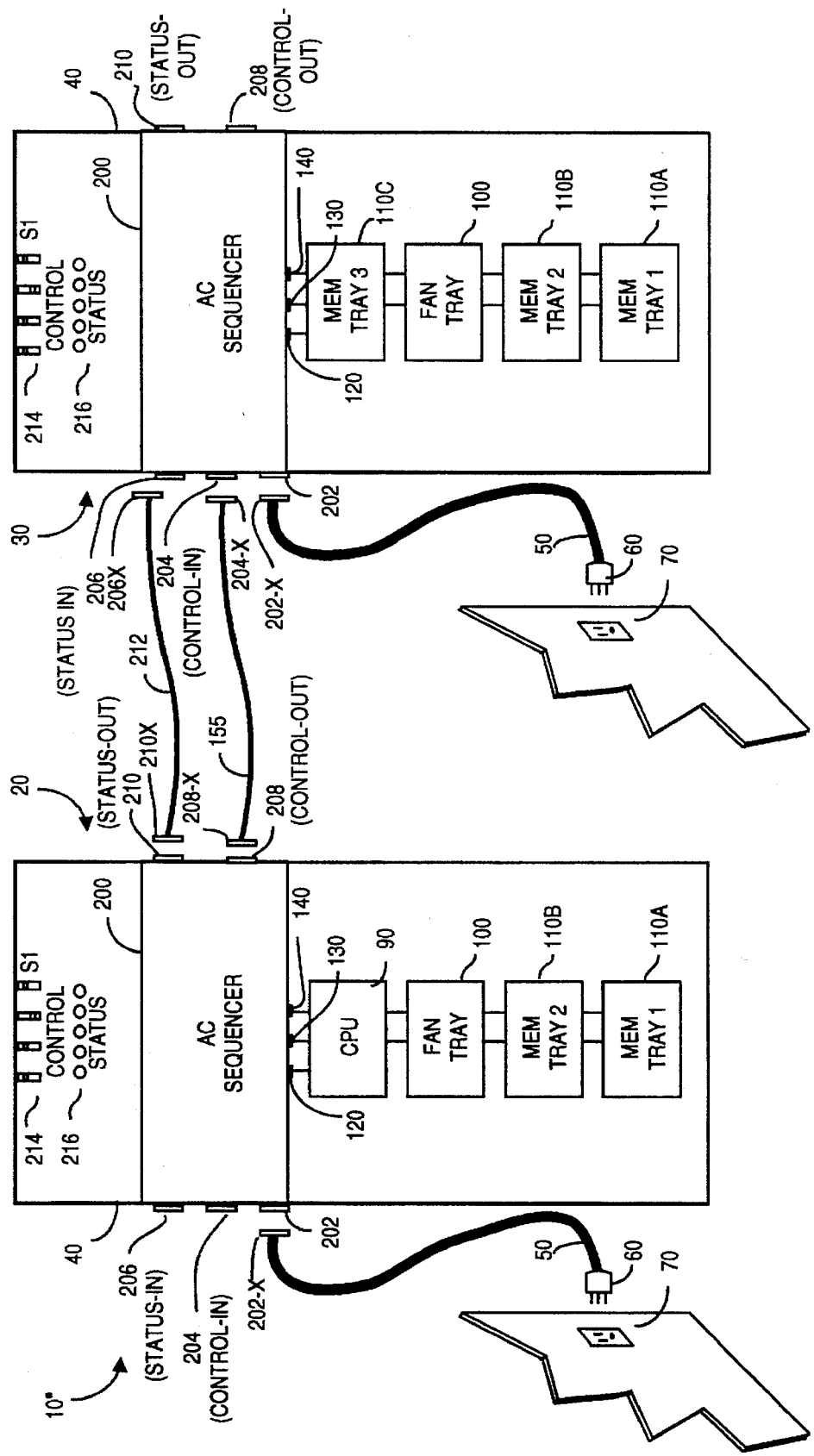
FIG. 2A depicts a system employing an AC sequencer used in the United States, according to the present invention.
Figure 2B:
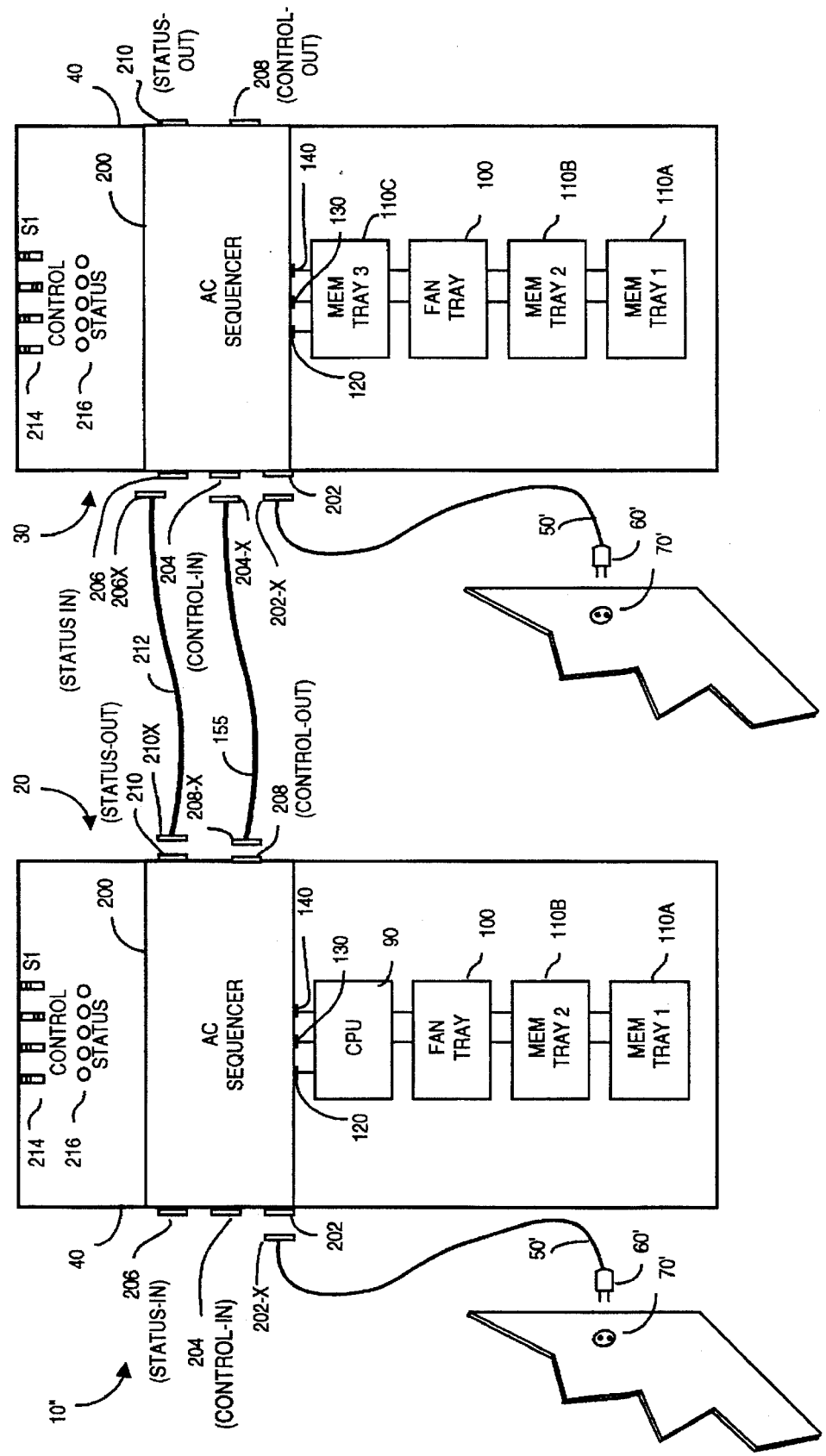
FIG. 2B depicts a system employing the AC sequencer of FIG. 2A in a foreign country, according to the present invention.

FIGS. 2A and 2B depict a system 10" in which server units 20 and slave units 30 each include an AC sequencer 200, according to the present invention. Unless otherwise noted, elements in FIGS. 2A and 2B bearing similar numbers to elements shown in FIG. 1A and 1B may be the same elements.

It is first seen that AC sequencer 200 includes a preferably internationally accepted input power connector 202 (or J13) to receive operating source AC voltage. By internationally accepted, it is meant that connector 202 meets applicable power standards and regulations in the major countries of the world. Connector 202 preferably is an IEC 309 connector, and is mounted on an accessible surface of AC sequencer 200. In practice IEC 309-compatible connectors 202 will have a 30 A current capacity (UL and CAS rating), or 32 A current capacity (VDE/DEMKO/SEMKO rating). In referring to this and other connectors herein, a "J-" nomenclature may be used to identify the connectors on the schematic of FIG. 4. Thus, connector 202 is also referred to herein as connector J13.

Note in FIGS. 2A and 2B, that AC wall sockets 70, 70' are different, as are AC connector plugs 60, 60', and AC power cords 50, 50'. It is understood that these sockets, plugs, and power cords will and indeed must conform to electrical power standards and regulations applicable to the country in which system 10" is being used. But note that the other end of each power cord 50, 50' terminates in an identical connector 204 that plugs into or otherwise mates with AC sequencer-mounted connector 202. Thus, although power cords 50, 50' and AC connector plugs 60, 60' may vary widely from country to country, the same connector 202-equipped AC sequencer 200 may be sold and used in each such country. This is in stark contrast to prior art AC sequencers such as shown in FIGS. 1A and 1B, which essentially must be dedicated at time of manufacture for use in a given country or region.

Referring still to FIGS. 2A and 2B, AC sequencer 200 includes a control-in connector 204, a status-input connector 206, a control-out connector 208, and a status-out connector 210. Preferably each of these connectors is mounted on an accessible surface of AC sequencer 200 and meets applicable electrical standards and regulations in all countries. As such, a single configuration of AC sequencer 200 may be manufactured and sold for use in substantially all countries. Understandably, the ability to manufacture and sell a single model AC sequencer worldwide rather than having to produce different models for different countries represents a savings in manufacturing and warehousing.

Of course AC sequencer 200 also sequentially outputs unswitched, switched 1 and switched 2 AC at voltage output ports 120, 130 and 140, as was described with respect to prior art sequencers 80 and 80'.

Contributing the universal aspect of sequencer 200 is the ability to permit intelligent daisy-chaining between a master unit, e.g., in system 20 in FIG. 2A or 2B, to one or more slave AC sequencers in other racks or cabinets, e.g., in system 30. By intelligent daisy-chaining it is meant that the master sequencer in system 20 has full control and status information with respect to the sequencer and other units within the slave system 30.

Thus, in FIGS. 2A and 2B, within system 10", control signals from master unit 20 to slave unit 30 are provided via a control cable or bus 155 whose ends terminate with connectors 208X and 204X, which respectively mate or connect with AC sequencer-mounted connectors 208 and 204. Similarly, status signals are carried by a status cable or bus 212 whose ends terminate with connectors 210X and 206X, which respectively mate or connect with AC sequencer-mounted connectors 210 and 206. In a preferred configuration, the status-in port 206 of the master unit 20 is connected by a cable and connectors to the status-out port 208 of the slave unit 30.

A visible surface of console or rack 40 is provided with control switches 214, including for example a three-way rocker switch S1, and with status indicators 216, which may include light-emitting diodes ("LEDs"). Controls 214 and indicators 216 will be described more fully herein.

Figure 3:
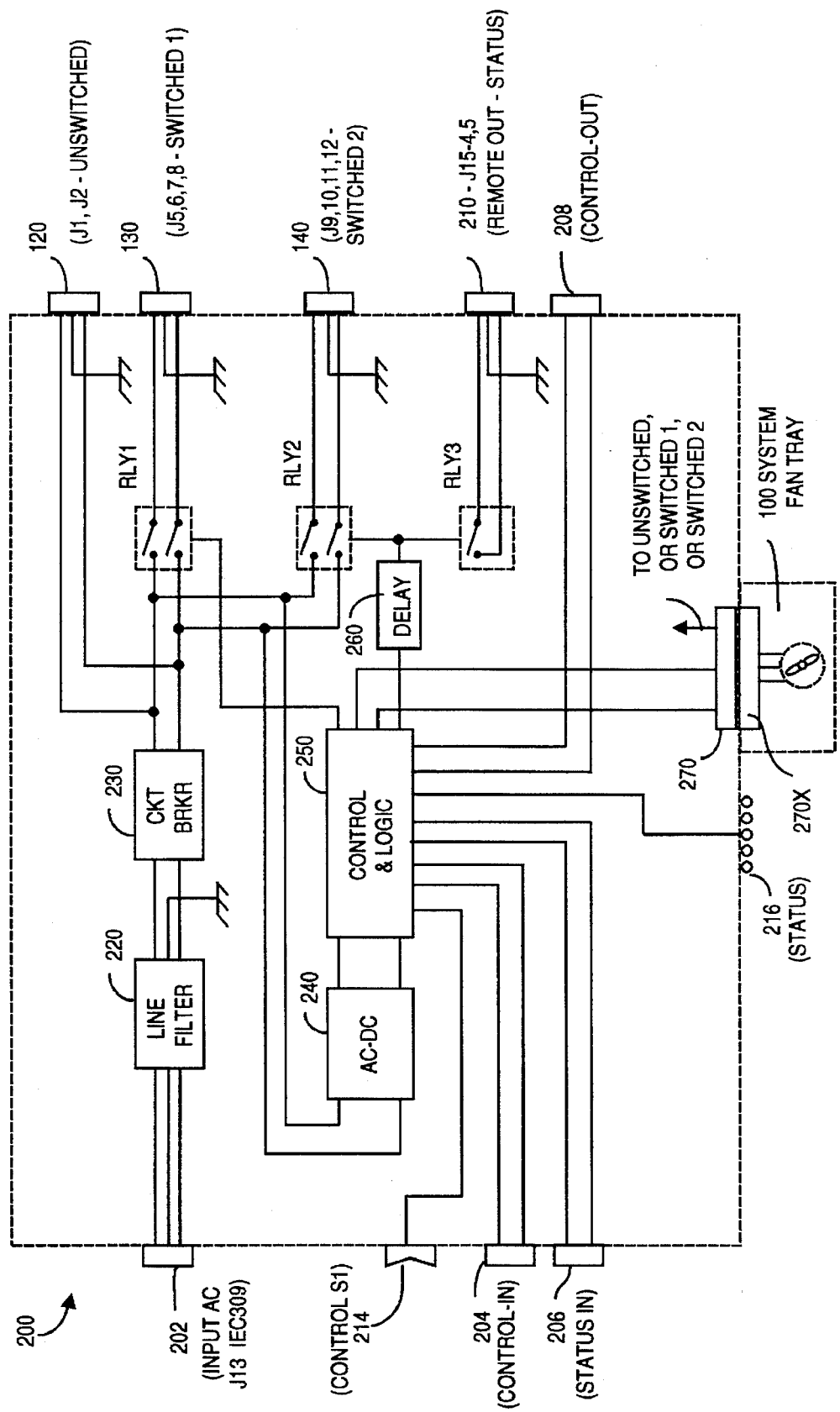
FIG. 3 is a block diagram of an AC sequencer, according to the present invention.
Figure 4:
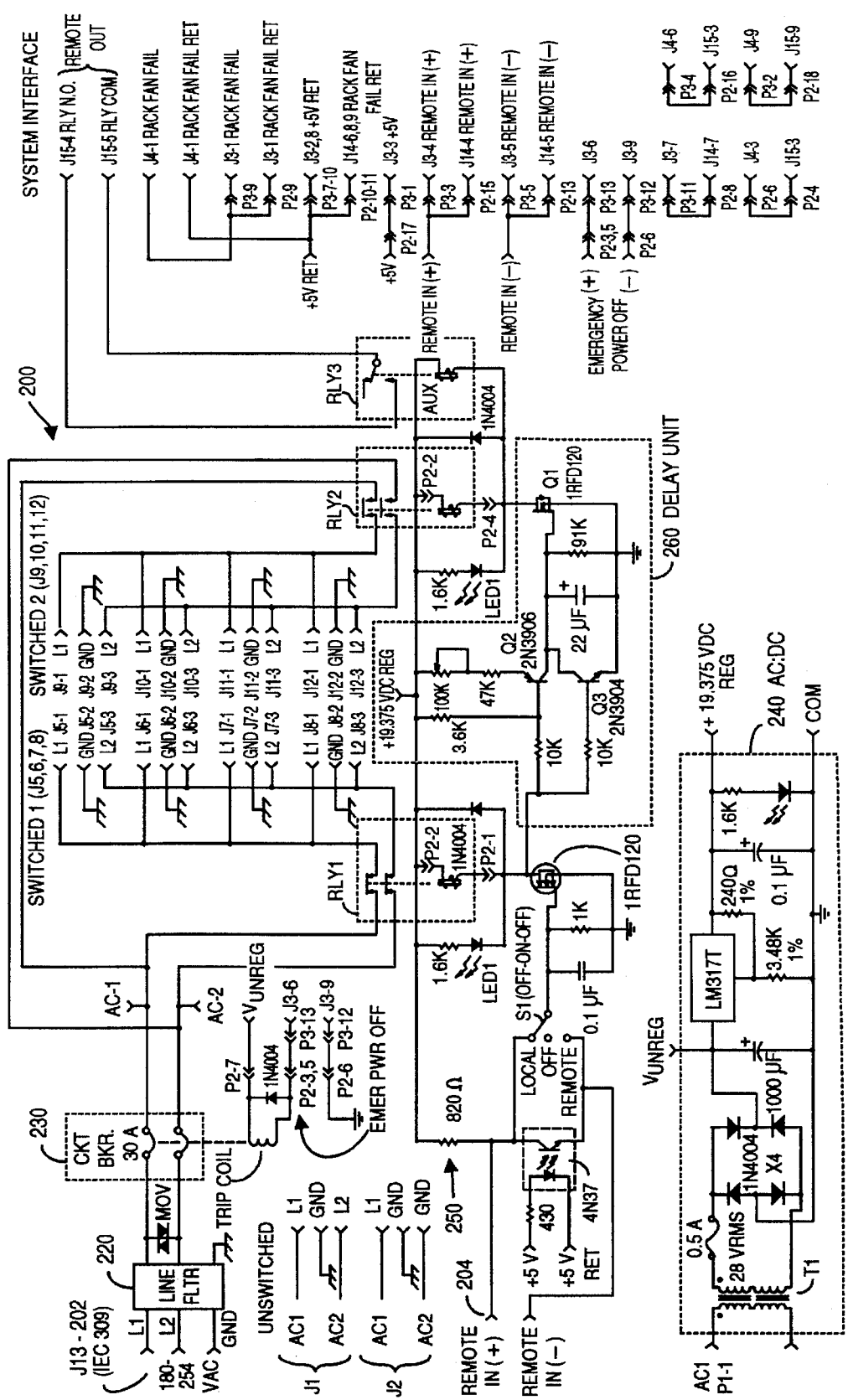
FIG. 4 is a schematic of a preferred embodiment of the AC sequencer of FIG. 3, according to the present invention.

FIG. 3 is a block diagram of AC sequencer 200, a schematic for which appears as FIG. 4. As noted, source AC operating potential is coupled to sequencer 200 via a universally accepted connector 202 (J13), mounted on the sequencer itself. In addition to receiving source AC at connector 202, sequencer 200 can receive input control signals at a control input connector 204 (CONTROL-IN), and can receive status signals at status input connector 206 (STATUS-IN). In contrast to prior art sequencers such as shown in FIGS. 1A and 1B, sequencer 200 can input and output control and status signals that are switch openings/ closings, and/or current source signals, and/or voltage source signals. It is this flexibility in the nature of the AC sequencer control signals that permits the present invention to implement intelligent daisy-chaining.

As noted, sequencer 200 sequentially provides unswitched AC at internal AC outlet port 120 (connectors J1, J2), switched 1 AC at internal AC outlet port 130 (connectors J5, J6, J7), and switched 2 AC at internal AC outlet port 140 (connectors J9, J10, J11, J12). Further, sequencer 20 provides control output signals at port connector 208 (CONTROL-OUT), and provides status output signals at port connector 210 (STATUS-OUT, J15-4,5).

As shown in FIG. 3 and FIG. 4, source AC is received at AC input port 202 (J13) and is filtered by line filter 220, and protected against current overload by a typically 30 A pair of circuit breakers 220. In the embodiment shown, source AC is typically about 180–250 VAC, 50 Hz–60 Hz.

The thus processed AC voltage is directly coupled to the first AC outlet port 120 (J1, J2), which receives AC power as soon as operating AC voltage is present at J13. Because no delay or other conditions are required to output this AC, AC present at 120" is referred to as "unswitched". This unswitched AC preferably is output at two outlet connectors denoted J1 (an IEC 320-C19 connector) and J2 (an AMP Universal Mate-N-Lok 3-circuit connector).

With reference to FIGS. 2A, 2B, 3 and 4, internal to rack 40 containing sequencer 200, AC power from unswitched AC outlet port 120 typically is coupled to the CPU card cage 90. Thus, as soon as the AC sequencer is powered-up, filtered and current-protected AC voltage is delivered to the CPU, but not yet to any associated memory units.

As shown in FIG. 3 and FIG. 4, an AC-to-DC voltage regulator 240 outputs a regulated source of DC voltage (here, about +19.3 VDC) to various control and logic components 250. The logic circuitry enables a first relay RLY1, enabling it to output "switched 1" AC voltage to second AC outlet port 130. However, enablement occurs only after an input power-on command is received at the control input connector 204. In the embodiment of FIG. 4, a 4N37 optical isolator transducer permits remote switching control in response to a voltage-sourced or current-sourced control signal coupled to connector 204, or in response to a short-circuit presented across the connections present in connector 204. Thus, the input power-on command may be voltage and/or current sourced, and is not limited to a switch opening or closure as in the prior art.

The second AC outlet port 130 is implemented with connectors denoted J5, J6, J7, J8 and preferably comprises AMP Universal Mate-N-Lok connector 3-circuit connectors. Preferably a light-emitting diode ("LED") LED1 coupled across the coil of RLY1 is used to visually signal status when RLY1 is energized and "switched 1" AC is being delivered at port 130. The "switched 1" AC voltage typically is coupled to storage units, e.g., 110A, 110B, 110C in FIGS. 2A, 2C, such as hard disks, CDs, optical disks, magnetic tape drives, among other peripheral devices mounted in rack 40 containing AC sequencer 200. In this fashion, it is ensured that CPU tray 90 receives operating potential before any of the memories trays are energized.

As shown in FIGS. 3 and 4, the onset of AC power to AC input port J13 produces a pulsed DC signal from the control and logic circuitry 250. This DC pulse signal is coupled from the control and logic circuitry 250 as input to a delay circuit 260. Unit 260 delays this pulse by a fixed time period, typically about 4 to 6 seconds, and thereafter energizes a second relay RLY2 and, optionally, a third relay RLY3.

Second relay RLY2, after the time delay, outputs "switched 2" AC voltage to third AC output port 140. This port is denoted J9, J10, J11, J12, and preferably comprises AMP Universal Mate-N-Lok connector 3-circuit connectors. An indicator LED2 provides visual status confirmation that RLY2 has energized and that "switched 2" voltage is present at connectors J9, J10, J11 and J12. "Switched 2" AC voltage may also be coupled to storage units in the rack containing AC sequencer 200. As shown in FIG. 3, a fan tray 100 may be coupled to any of the "unswitched", "switched 1", or "switched 2" sources of AC.

The third relay RLY3 is similarly energized after the time delay, and makes contact between "remote output" pins 4 and 5 on connecter J15, preferably a 9-circuit subminiature type "D" connector. The RLY3-switched connections may handle switch closures, voltage-sourced signals, and/or current-sourced signals.

AC sequencer 200 preferably includes a three-way rocker-type control switch S1 that determines whether the sequencer is to be powered-up (e.g., turned-on), or is to be powered-up under local control, or under remote power-up control from another AC sequencer 200 in another rack or cabinet. In the "OFF" position, S1 terminates AC input operating power from sequencer 200, even if source-AC is present at J13. In the "LOCAL" position, S1 permits sequencer 200 to respond normally, e.g., to output AC voltages at output ports 120, 13", and 140. In the "REMOTE" position, signals received at CONTROL-In port 204 (perhaps from a remote slave unit) can command a power-up state of sequencer 200.

Intelligent daisy chain operation, such as shown in FIGS. 2A and 2B, permit master unit 20 not only to utilize storage and other resources physically located in remote slave unit 30, but to sense operating conditions present in the remote unit and, if necessary, to power-off the remote unit.

In FIG. 2A, for example, CPU tray 90 in master unit 20 can access five trays of memory storage (e.g., two storage units located in unit 20, and three additional storage trays located in unit 30). Control switches, e.g., 214, and status displays, e.g., 216 on rack 40 permit users of the master unit 20 to see and/or control what is occurring within the remote unit 30 (and vice versa, if desired).

In FIG. 3, a system fan tray 100 is shown coupled to an AC sequencer 200 via mating connectors 270 (associate with the sequencer) and 270X, associated with the fan tray. Suppose, for example, that fan tray 100 in the remote unit 30 fails, or that the air conditioning fails in the room in which remote unit 30 is located. Such failure(s) and resultant overheating can readily lead to degradation of data associated with any or all of the storage units located in the remote unit 30. Although remote unit 30 does not include a CPU tray, it is nonetheless coupled via connectors 270, 270X to its associated sequencer 200 in a slave unit 30, and via cables 155 and 212 to master unit 20. Because the signals carried by these cables can include voltage-sourced and current-sourced signals, at least one of the status signals can indicate a dangerous temperature condition within unit 30.

CPU tray 90 within the master unit 20 can recognize this excess temperature condition and can issue a control signal via cable 155 that remotely powers-down, if necessary, unit 30 entirely, or any combination of "unswitched", "switched 1" and "switched 2" operating voltage. Thus, if the memory trays in remote unit 30 were operating from "switched 2" power, master unit 20 could remotely shutdown only the "switched 2" power within unit 30.

In addition, if desired a status indicator 216 at unit 20 could signal the excess temperature condition at unit 30, and can signal that unit 30 has been powered down by unit 20. This level of status recognition and control is simply not available with prior art AC sequencers. To benefit from such remote status recognition and control, switch S1 in the AC sequencer in the remote unit 30 would be placed in the "REMOTE" position. Of course, a technician in the vicinity of the remote unit 30 who recognized the excess temperature condition could manually switch S1 to the "OFF" position, to power-down unit 30 (but not unit 20).

It will be appreciate that because the status and control signals are coupled to cable 155 by internationally acceptable connectors at 135-OUT and 135-IN, a single model of AC sequencer 200 may be used in essentially all countries.

Modifications and variations may be made to the disclosed embodiments without departing from the subject and spirit of the invention as defined by the following claims.

What is claimed is:

1. An alternating current (AC) sequencer coupleable to a source of AC input operating voltage from which at least two output modes of AC operating voltage are sequentially provided by said AC sequencer, comprising:

a source AC input connector, mounted to said AC sequencer, that receives said AC input operating voltage and provides said AC input operating voltage to said AC sequencer;

wherein a source of said AC input operating voltage is coupled to said AC sequencer by a second connector that attaches to said source AC input connector;

a first AC outlet port that is coupled to said connector to provide a first unswitched output AC operating voltage whenever said AC input operating voltage is present at said connector;

an input control port coupled to an input control port connector; and a circuit, coupled to said connector and to said input control port, that outputs at least one of (i) a switched 1 version of said AC input operating voltage but only when a power-on control signal is coupled to said input control port connector, and (ii) a switched 2 version of said switched 1 version of said AC input operating voltage but only after a delay time of at least one second from occurrence of said switched 1 version.

2. The AC sequencer of claim 1, wherein:
   said source AC input connector is an internationally accepted input power connector.

3. The AC sequencer of claim 1, wherein said delay time ranges from about four to six seconds and is created by said circuit.

4. The AC sequencer of claim 1, further including:
   a status input port coupled to a status input port connector and to said circuit;

an output control port coupled to an output control connector and to said circuit;

an output status port coupled to an output status connector and to said circuit; and at least one indicator signalling status associated with a signal presented to said status input port connector;

wherein status of a second said AC sequencer may be sensed by said circuit in said AC sequencer by coupling together a said output status connector on said second AC sequencer to said status input port connector of said AC sequencer; and wherein said status of said second AC sequencer may be signalled by a said indicator on said AC sequencer.

5. The AC sequencer of claim 4, wherein said circuit further includes at least one transducer element permitting said circuit to respond to a signal at said status input port connector that is selected from the group consisting of (i) a switch opening, (ii) a switch closure, (iii) a voltage-based signal, and (iv) a current-based signal.

6. The AC sequencer of claim 4, wherein said circuit further includes at least one transducer element permitting said circuit to respond to a signal at said control input port connector that is selected from the group consisting of (i) a switch opening, (ii) a switch closure, (iii) a voltage-based signal, and (iv) a current-based signal;

wherein said second AC sequencer may be remotely controlled by said circuit in said AC sequencer in at least one mode selected from the group consisting of (i) said second AC sequencer is caused to receive said source AC input operating voltage and to power-on, (ii) said second AC sequencer is caused to not receive said source AC input operating voltage and to power-off, (iii) said second AC sequencer is caused to cease outputting a said switched 2 version of said AC input operating voltage, and (iv) said second AC sequencer is caused to cease outputting a said switched 1 version of said AC input operating voltage.

7. The AC sequencer of claim 1, wherein:
   said circuit includes a first transducer permitting said circuit to respond to a signal at said control input port connector that is selected from the group consisting of (i) a switch opening, (ii) a switch closure, (iii) a voltage-based signal, and (iv) a current-based signal;

and further including:

a status input port coupled to a status input port connector and to a second transducer in said circuit permitting said circuit to respond to a signal at said status input port connector that is selected from the group consisting of (i) a switch opening, (ii) a switch closure, (iii) a voltage-based signal, and (iv) a current-based signal;

an output control port coupled to an output control connector and to said circuit;

an output status port coupled to an output status connector and to said circuit; and an indicator signalling status associated with a signal presented to said status input port connector.

8. For use with an electronic system having a master system that includes a first subsystem and a second subsystem that must receive AC operating power after AC operating power is applied to said first subsystem, said electron system having a slave system that includes a first slave subsystem and a second slave subsystem that must receive AC operating power after AC operating power is applied to said first slave subsystem, a master AC sequencer sequentially providing AC operating power to said master system and a slave AC sequencer sequentially providing AC operating power to said slave system, each said AC sequencer being identical and comprising:

a source AC input connector, mounted to said AC sequencer, that if coupled by a mating connector to a source of AC input operating voltage receives said AC input operating voltage and provides said AC input operating voltage to said AC sequencer;

a first AC outlet port that is coupled to said connector to provide a first unswitched output AC operating voltage whenever said AC input operating voltage is present at said connector, said first AC outlet port being coupled to said first subsystem;

a circuit, coupled to said connector and to said input control port, that outputs at least one of (i) a switched 1 version of said AC input operating voltage but only when a power-on control signal is coupled to said input control port connector, and (ii) a switched 2 version of said switched 1 version of said AC input operating voltage but only after a delay time of at least one second from occurrence of said switched 1 version;

said second subsystem receiving from said circuit one of said switched 1 and said switched 2 version of said AC input operating voltage;

an input control port coupled to an input control port connector and to said circuit;

a status input port coupled to a status input port connector and to said circuit;

an output control port coupled to an output control connector and to said circuit; and an output status port coupled to an output status connector and to said circuit;

said circuit being responsive to a signal present at said input control port connector, at said status input port, or a combination thereof, to be selected from the group consisting of (i) a switch opening, (ii) a switch closure, (iii) a voltage-based signal, and (iv) a current-based signal.

9. The AC sequencer of claim 8, wherein said source AC input connector is an internationally accepted input power connector.

10. The AC sequencer of claim 8, wherein:

said master system is a server in which said first subsystem includes a central processing unit and in which said second subsystem include a memory unit; and wherein said slave unit is a client in which said first slave subsystem includes a memory unit, and in which said second subsystem includes a fan unit.

11. The AC sequencer of claim 10, wherein said status output port of said slave system is coupled to said status input port of said master system, and wherein said control output port of said master system is coupled to said control input port of said slave system;

wherein said slave AC sequencer may be remotely controlled by said circuit in said master AC sequencer in at least one mode selected from the group consisting of (i) said slave AC sequencer is caused to receive said source AC input operating voltage and to power-on, (ii) said slave AC sequencer is caused to not receive said source AC input operating voltage and to power-off, (iii) said slave AC sequencer is caused to cease outputting a said switched 2 version of said AC input operating voltage, and (iv) said slave AC sequencer is caused to cease outputting a said switched 1 version of said AC input operating voltage.

12. The AC sequencer of claim 10, further including at least one indicator signalling status associated with a signal presented to said status input port connector;

wherein a said status indicator disposed adjacent said master system provides status information of conditions present within said slave system.

13. The AC sequencer of claim 12, wherein:

said status information includes at least one information selected from the group consisting of (i) status of said memory unit in said slave unit, and (ii) operating condition of said fan unit in said slave unit.

14. A method permitting an AC sequencer to universally and sequentially provide AC operating voltage from a source of AC input operating voltage, the method including the following steps:

(a) mounting a source AC input connector to said AC sequencer, said source AC input connector receiving said AC input operating voltage and providing said AC input operating voltage to said AC sequencer;

(b) coupling a source of said AC input operating voltage to said AC sequencer by a second connector that attaches to said source AC input connector;

(c) providing said AC sequencer with a first AC outlet port that is coupled to said connector to provide a first unswitched output AC operating voltage whenever said AC input operating voltage is present at said AC input connector;

(c) providing an input control port coupled to an input control port connector on said AC sequencer; and (d) providing circuitry, coupled to said connector and to said input control port, that outputs at least one of (i) a switched 1 version of said AC input operating voltage but only when a power-on control signal is coupled to said input control port connector, and (ii) a switched 2 version of said switched 1 version of said AC input operating voltage but only after a delay time of at least one second from occurrence of said switched 1 version.

15. The method of claim 14, wherein at step (a), said source AC input connector is an internationally accepted input power connector.

* * * * *